April 10, 1928.  1,665,870

L. WETMORE

SHAPING DEVICE

Filed Aug. 26, 1926   2 Sheets-Sheet 1

INVENTOR
Laurence Wetmore,
BY
ATTORNEY

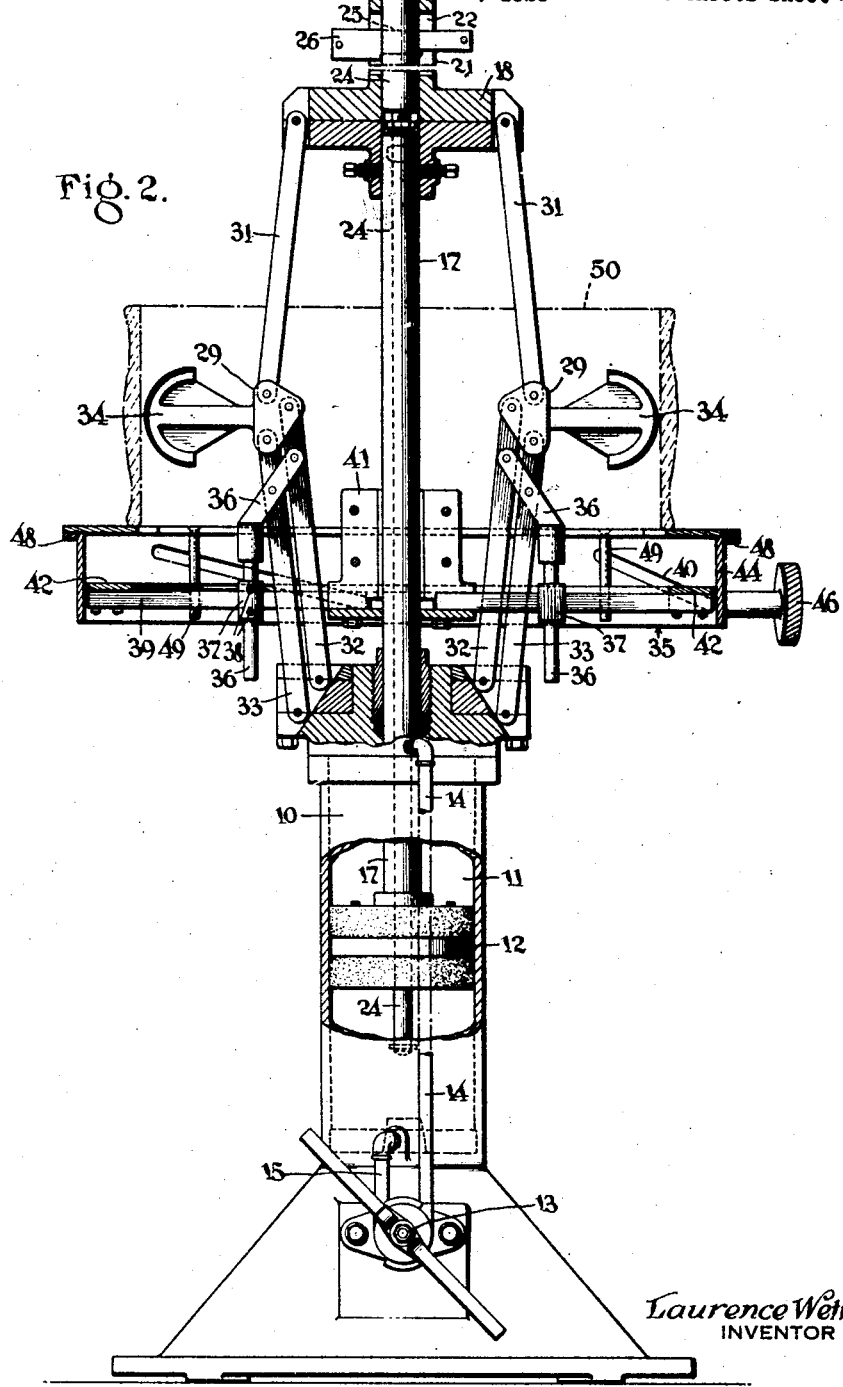

Patented Apr. 10, 1928.

1,665,870

UNITED STATES PATENT OFFICE.

LAURENCE WETMORE, OF AKRON, OHIO, ASSIGNOR TO THE GOODYEAR TIRE & RUBBER COMPANY, OF AKRON, OHIO, A CORPORATION OF OHIO.

SHAPING DEVICE.

Application filed August 26, 1926. Serial No. 131,625.

My invention relates to machines for shaping pneumatic tire bands of the so-called "mechanical shaper" type, and it has particular relation to that part of a machine of the above designated character which is adapted to center the band prior to the shaping operation.

One object of my invention is to provide means for centering a tire band quickly and accurately preparatory to the shaping operation.

Another object of the invention is to provide a band centering device which is readily adjustable to accommodate bands of different widths.

According to the so-called "drum built" method of fabricating tires, the elements comprising the tire carcass are assembled upon a substantially flat drum or mandrel. After the assembling operation is completed the resultant flat band is formed into a U-shape by stretching the mid portion of the tire and at the same time causing the beads to approach each other. Subsequently, an airbag is inserted in the shaped carcass, after which the tire is placed in a mold and vulcanized.

One type of mechanical shaper consists of a plurality of individual overlapping ring segments which are movable radially, and which engage and stretch the central portion of a band outwardly. Before the ring segments engage the band, it is important that the band be centered properly in order that the tire may be shaped symmetrically. To this end I have provided a band supporting mechanism which is adjustable with respect to the periphery of the ring segments.

For a better understanding of the principles of my invention, reference may now be had to the accompanying drawings forming a part of the specification, in which;

Fig. 2 is an elevational view of the machine partially in cross-section, taken substantially along the line II—II of Fig. 1;

Figure 1:
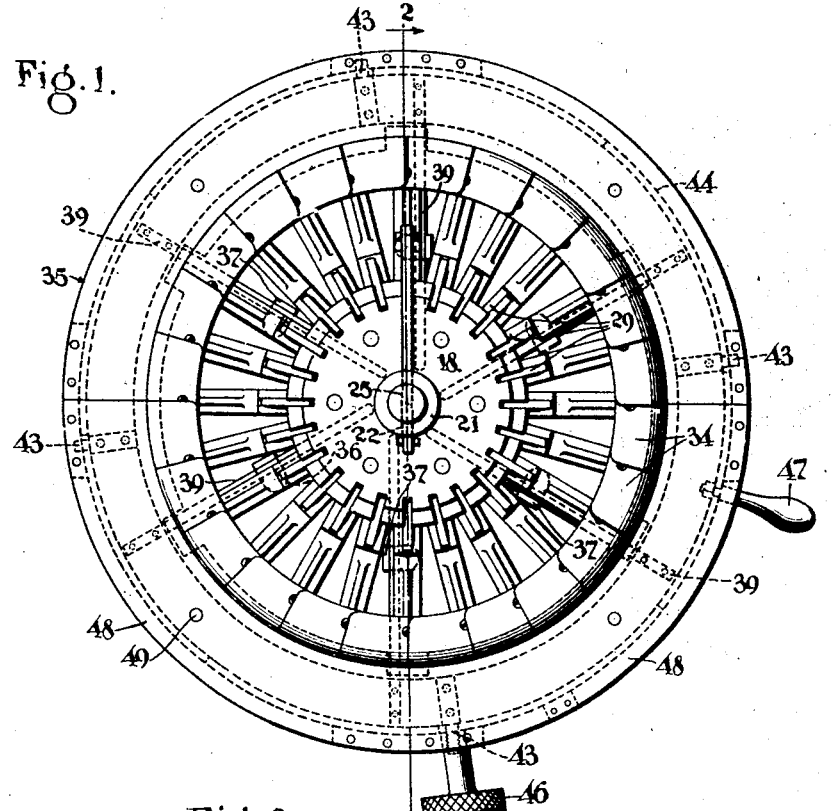
Fig. 1 is a plan view of the structure embodying one form which my invention may assume.

According to my invention I provide a base casting 10 which supports the shaping device and which includes a vertical piston chamber 11. A piston 12 is contained in the chamber, which is actuated in either direction by compressed air, the air being admitted by means of a foot operated valve 13 to the upper end of the chamber through one pipe 14, and to the lower end through another pipe 15. A hollow piston rod 17 is secured to the piston 12, and extends vertically upwardly through the top of the chamber. This rod is provided with a collar member 18 which is rigidly secured to the upper extremity of the piston rod and is actuated vertically therewith.

The collar 18 includes a hub portion 21 which extends vertically upwardly and is provided with a slot 22, that passes diametrically therethrough. A shaft 24 is disposed within the hollow rod 17 and projects slightly beyond either end thereof. The lower extremity of the shaft is adapted to abut the base of the cylinder chamber, whereas the upper end passes through the slotted hub 21 and is likewise provided with a slot 25 which is aligned with the slot 22 in the hub. In order to vary the distance which the shaft 24 extends below the piston 12, and thereby vary the lower limit of travel of the piston, a stepped key member 26 is inserted in the aligned slotted portions of the hub member 21 and the shaft 24. When the piston travels downwardly the lower end of the shaft 24 will engage the base of the cylinder. It will be apparent, therefore, that the effective length of the shaft may be changed by properly positioning the key, whereby the limit of travel of the piston is controlled.

A plurality of toggle members 29 interconnect the collar 18 and the top of the piston chamber, each toggle member including three pivoted links 31, 32 and 33 and a tire engaging segment 34. As best shown in Fig. 1, the segments 34 are provided with outer curved shell-like portions which engage each other in overlapping relation and define a substantially annular expansible configuration. Links 31 connect the collar to the tire engaging segment 34, whereas links 32 and 33 connect the top of the piston chamber to the segment. The ring segments overlap each other to some extent and are actuated radially outwardly when the collar member is drawn downwardly by the rod 17.

Figure 3:
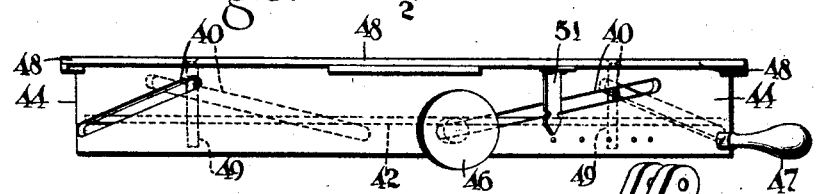
Fig. 3 is an elevational view of the adjustable band supporting element.
Figure 4:
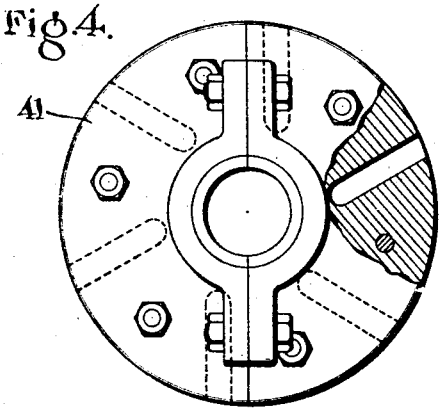
Fig. 4 is a plan view, partially in cross-section, of a guide collar.
Figure 5:
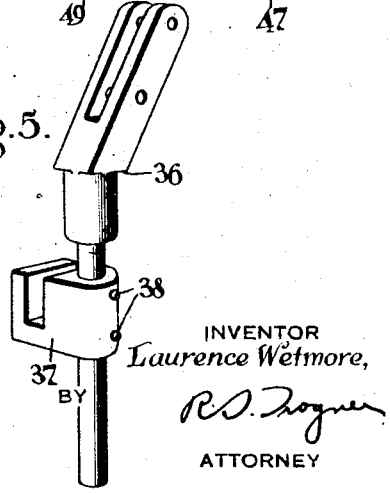
Fig. 5 is a view in perspective of a bifurcated suspension member.

A centering device, indicated generally by the numeral 35, includes a plurality of bifurcated members 36 which are pivotally connected to the lower sets of links 32 and 33. A grooved member 37 is rigidly secured to each of the bifurcated members in any desired position by means of set screws 38, and is adapted to slidably support a radial member 39. One end of each of the radial members is rigidly secured to a collar 41 which is slidably disposed about the piston rod 17. The other end of each rod is secured to a ring member 42 which embodies a plurality of radially protruding lug members 43 that are integral therewith. A cylinder 44 provided with inclined or helical slots 40 surrounds the ring 42 and is supported by the lugs 43 which protrude through the slots. One of the lugs is provided with screw threads and constitutes a male member, which, in combination with a female set screw member 46, serves to secure the ring in any desired position of adjustment. A handle 47 which is secured to the cylinder 44 is provided for the purpose of facilitating the adjustment of the device. A shouldered annular member 48 rests unsecured on the cylindrical member 44 and is provided with four pins 49 which are rigidly secured thereto. The pins 49 pass through openings provided therefor in the ring member 42 and prevent relative rotative movement between the ring 42 and the disc member 48, upon which a tire band 50 is positioned. In order to ascertain more easily the relative distance between the band-engaging elements 34 and the annular member 48 upon which the band 50 rests, a dial pointer member 51 is secured to the disc member 48 and is adapted to indicate the distances stamped on the cylindrical member 44 in the manner illustrated in Fig. 3.

To adjust the device, in order that the band support 48 will properly center or gauge the band 50 with respect to the band shaping elements 34, the female set screw member 46 is loosened, after which the cylindrical member 44 is rotated in the proper direction through the required number of degrees indicated by the dial pointer 51. The helical slots 40 provided in the member 44, together with the protruding lugs 43, cause the cylinder to be raised or lowered, depending upon the direction in which the cylinder 44 is rotated. Having established the proper relationship between the band support 48 and the band engaging elements 34, the set screw 46 is again tightened.

In operating the machine the operator positions the band 50 upon the band support 48, in the manner illustrated in Fig. 2. Subsequently the piston 12 is actuated to move the segments 34 radially outwardly, thereby expanding the central portion of the band. After a short lapse of time the piston is actuated in the opposite direction which causes the shaping elements to withdraw from engagement with the shaped band, thereby completing the cycle of operation.

It has previously been noted that the limit of the downward movement of the piston 12 can be varied by adjusting the stepped key member 26. Obviously this adjustment is made whenever it is desirable that the amount of radial expansion of the ring segments be changed, as for example when tires of different sizes are being shaped.

Although I have described but one form which my invention may assume and have described in detail but a single application thereof, it will be apparent to those skilled in the art that the invention is not so limited but that various minor modifications and changes may be made therein without departing from the spirit of the invention or from the scope of the appended claims.

What I claim is:

1. The combination with a tire band shaping device having a plurality of radially movable band engaging members disposed in substantially annular form, of a band centering mechanism comprising adjustable means movable independently in an axial direction with respect to the annular form of the band engaging members for gauging the position of the band with respect to the members and means operatively connecting the adjustable means to the shaping device.

2. The combination with a tire band shaping device having a plurality of band engaging elements each supported by an individual toggle mechanism, of a band centering device comprising a plurality of members suspended from the toggle members, a plurality of radial members adapted to be supported by the suspended members, an annular member secured to the radial members and means in adjustable relation with the annular member for supporting the band.

3. The combination with a tire band shaping device having a plurality of band engaging elements supported by toggle members, of a centering device comprising a plurality of coacting elements secured to the toggle members, radial members supported by the coacting elements, an annular member secured to the outer extremities of the radial members, a plurality of lugs integral with the annular member and a tire band support having a plurality of helical slots in which the lugs are slidably disposed.

4. The combination with a tire band shaping device having a plurality of band engaging elements supported by toggle members, of a centering device comprising a plurality of coacting elements secured to the toggle members, radial members supported by the coacting elements, an annular member having a plurality of lugs integral therewith secured to the outer extremities of the radial members, a tire band support having a plurality of helical slots in which the lugs are slidably disposed, and means to secure the band support in any desired position of adjustment.

5. The combination with a tire band shaping device having a plurality of toggle members, individual band engaging elements actuated thereby and means for actuating the toggle members, of a band centering device including a plurality of radial members supported by the toggle members, a collar slidably disposed with respect to the actuating means secured to the inner ends of the radial members and adjustable annular means operatively connected to the outer ends of the radial members, said annular means being adapted to engage the tire band.

6. The combination with a tire band shaping device having a plurality of toggle members, individual band engaging elements actuated thereby and means for actuating the toggle members, of a band centering device including a plurality of radial members secured to the toggle members, a collar slidably disposed with respect to the actuating means secured to one end of each of the radial members and an annular member supported by the radial members adapted to support a tire band, said annular member being adjustably disposed with respect to the band engaging elements.

7. The combination with a tire band shaping machine having means adapted to shape the central portion of a tire band, of a band centering device comprising a band engaging member in operative relation with respect to the shaping means, adapted to support the band, a cylindrical member provided with a plurality of helical slots adapted to freely support the engaging member and a plurality of lugs operative by movement of the band centering device and projecting through the slots in the cylindrical member slidably to support the latter.

In witness whereof, I have hereunto signed my name.

LAURENCE WETMORE.